(No Model.) 2 Sheets—Sheet 2.

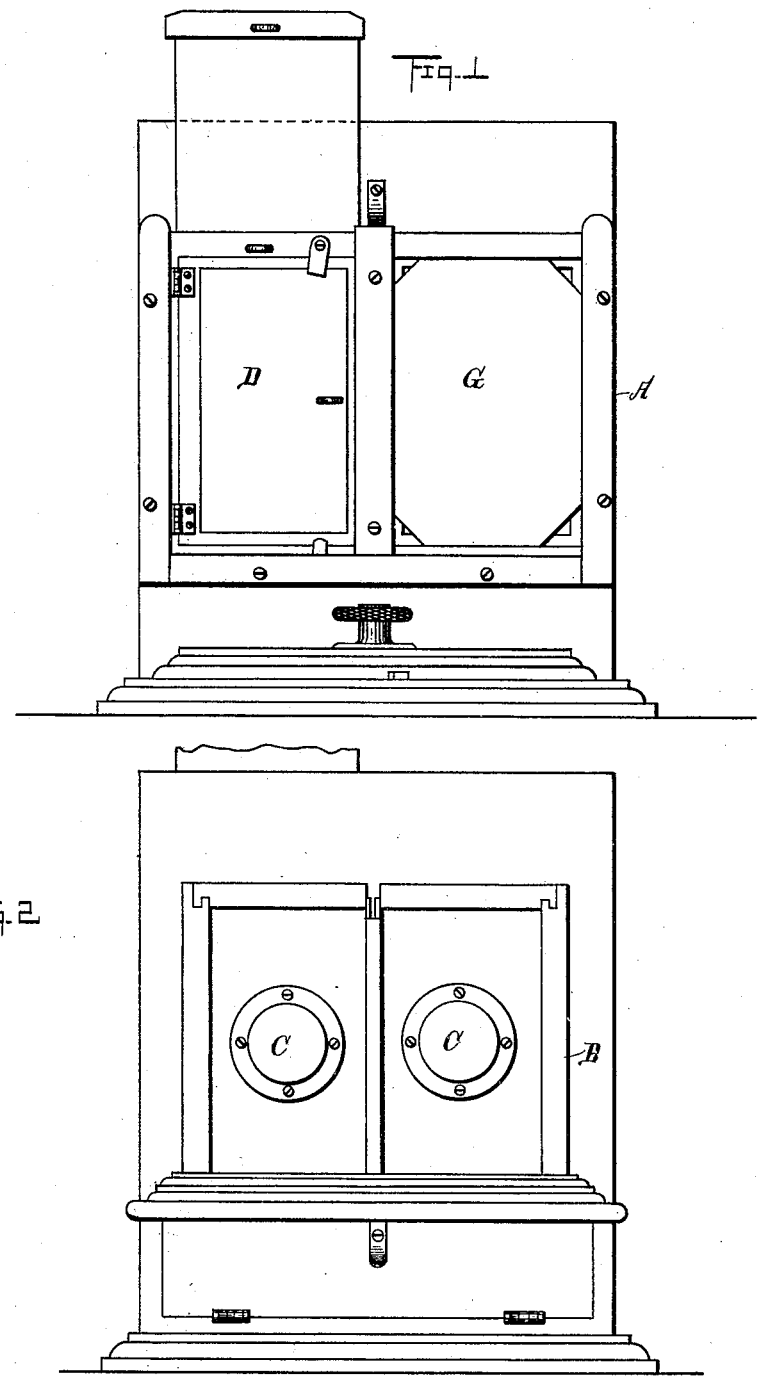

J. W. FREEDLE.
CAMERA BOX.

No. 417,863. Patented Dec. 24, 1889.

Witnesses
B. S. Lowrie
Will B. Sage

Inventor
James W. Freedle
By Leggett & Leggett
Attorneys.

UNITED STATES PATENT OFFICE.

JAMES W. FREEDLE, OF CLEVELAND, OHIO.

CAMERA-BOX.

SPECIFICATION forming part of Letters Patent No. 417,863, dated December 24, 1889.

Application filed May 28, 1889. Serial No. 312,376. (No model.)

*To all whom it may concern:*

Be it known that I, JAMES W. FREEDLE, of Cleveland, in the county of Cuyahoga and State of Ohio, have invented certain new and useful Improvements in Camera-Boxes; and I do hereby declare the following to be a full, clear, and exact description of the invention, such as will enable others skilled in the art to which it pertains to make and use the same.

My invention relates to an improved camera-box having two compartments respectively provided with lenses having a common focus, the one compartment having a plate-holder and the other compartment having a ground glass, to the end that the photographer may have always in view the figure on the ground glass during the exposure of the plate, and that no time is lost in shifting the ground glass and the plate-holder. In taking, for instance, so-called "instantaneous photographs," and more especially of children and such animals as are liable to change position, it is of the greatest importance to be able to expose the plate as soon as the object has been properly focused, and also it is desirable, where the light is not strong, to prolong the exposure in case the object does not move, and to instantly terminate the exposure in case the object does move. I have therefore devised the camera-box illustrated in the accompanying drawings.

Figure 3:
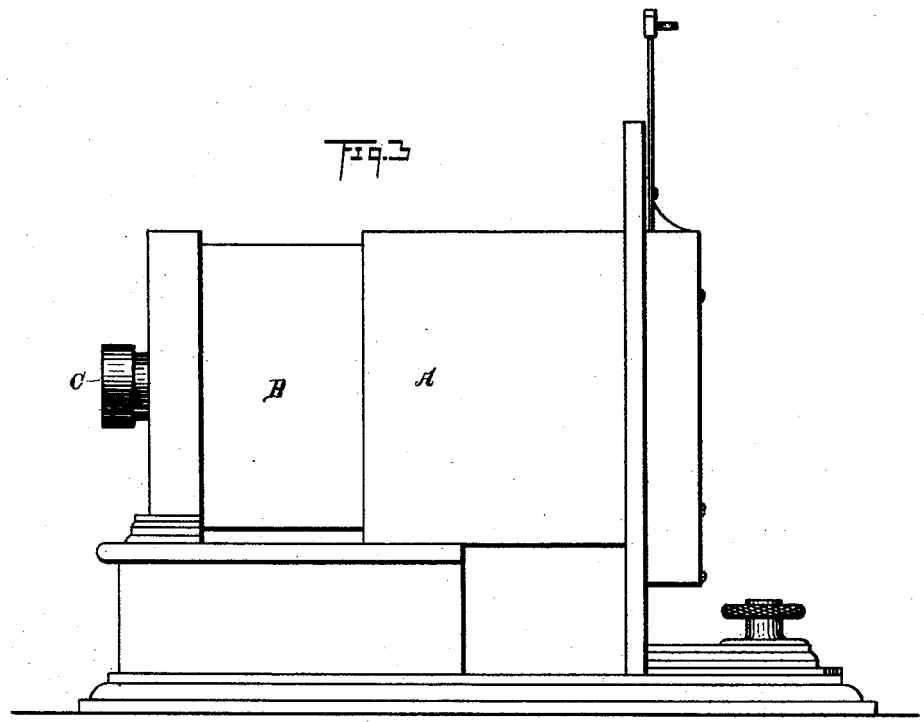
Figure 4:
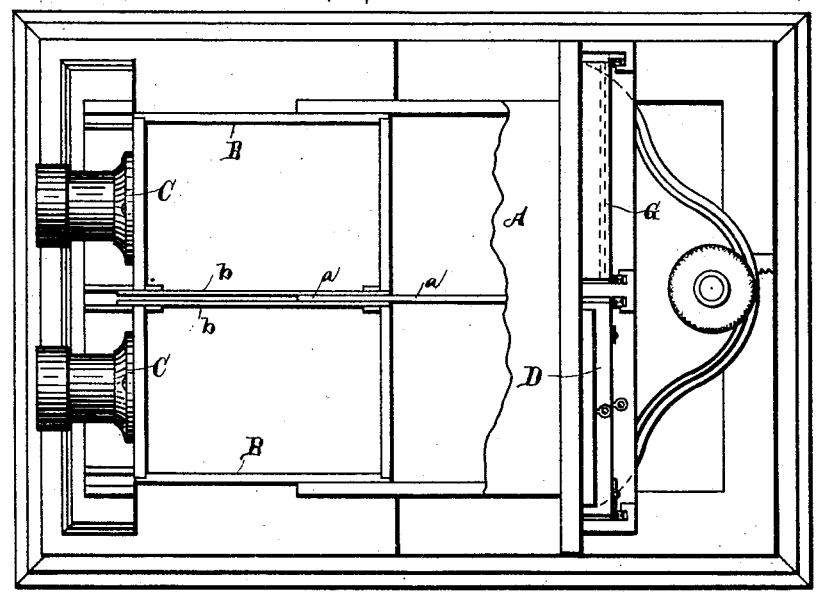

Figures 1 and 2 are elevations showing reverse ends of the camera-box. Fig. 3 is a side elevation. Fig. 4 is a plan, a portion of the top wall being broken away to show the internal construction.

The camera-box comprises two telescoping sections A and B, the former having a thin vertical longitudinal central partition $a$, preferably of thin plate metal, and section B has corresponding partitions $b$ $b$, slightly separated, to leave a pocket between for receiving partition $a$. These partitions divide the camera-box into two longitudinal compartments. Each compartment is provided with a lens C attached to section B, the two lenses having a common focus. The one compartment is provided with plate-holder D, and the other compartment is provided with ground glass G, the glass and holder being attached to section A. The other appliances—for instance, for focusing and for exposing the plate—may be of ordinary construction, and hence need not be described.

With such construction the photographer first inserts the plate and then proceeds to focus the object, and as soon as this is accomplished the exposure of the plate may instantaneously follow, the operator meantime having in view the figure on the ground glass, and watching to see that the object does not move, and of course instantly closing the "blind" in case the object does move.

The marked advantages of my improved instrument in taking so-called "instantaneous photographs" of objects liable to move, and where from want of light it is desirable to prolong the exposure, will be readily appreciated by persons skilled in the art.

What I claim is—

A camera-box composed of two telescoping sections divided into two longitudinal compartments by a centrally-located telescoping partition, each compartment being provided with a lens, the two lenses having a common focus, one compartment having a removable plate-holder and the other a ground glass, substantially as set forth.

In testimony whereof I sign this specification, in the presence of two witnesses, this 26th day of April, 1889.

JAMES W. FREEDLE.

Witnesses:
CHAS. H. DORER,
ALBERT E. LYNCH.